(12) United States Patent
Kobayashi

(10) Patent No.: US 7,555,765 B2
(45) Date of Patent: Jun. 30, 2009

(54) DISK CARTRIDGE WITH AN INNER ROTOR

(75) Inventor: Daiki Kobayashi, Miyagi (JP)

(73) Assignee: Sony Corporation, Tokyo (JP)

( * ) Notice: Subject to any disclaimer, the term of this patent is extended or adjusted under 35 U.S.C. 154(b) by 504 days.

(21) Appl. No.: 11/387,234

(22) Filed: Mar. 22, 2006

(65) Prior Publication Data

US 2006/0218570 A1    Sep. 28, 2006

(30) Foreign Application Priority Data

Mar. 25, 2005    (JP) ............................ P2005-089495

(51) Int. Cl.
*G11B 23/03*    (2006.01)

(52) U.S. Cl. ..................................... 720/739

(58) Field of Classification Search ......... 720/643–644, 720/725, 732–735, 738–744; 360/133
See application file for complete search history.

(56) References Cited

U.S. PATENT DOCUMENTS

2004/0205809 A1 * 10/2004  Saji et al. .................. 720/741
2004/0210921 A1 * 10/2004  Shibagaki et al. .......... 720/741

FOREIGN PATENT DOCUMENTS

| JP | 10-154385   | 6/1998  |
| JP | 2001-332054 | 11/2001 |
| JP | 2002-050147 | 2/2002  |
| JP | 2003-085917 | 3/2003  |
| JP | 2003-109343 | 4/2003  |
| JP | 2004-206793 | 7/2004  |
| JP | 2004-273027 | 9/2004  |

\* cited by examiner

*Primary Examiner*—Jorge L Ortiz Criado
*Assistant Examiner*—Nathan Danielsen
(74) *Attorney, Agent, or Firm*—K&L Gates LLP

(57) ABSTRACT

A disk cartridge is provided. The disk cartridge includes a cartridge case including an upper shell having an inner circumferential wall and a lower shell having a first opening for recording and/or playback; an inner rotor rotatably disposed in the cartridge case and having a second opening corresponding to the first opening and an annular portion on the periphery thereof; and shutter members disposed between the inner rotor and the lower shell and rotatably attached to the inner rotor. The shutter members open the first and second openings when the inner rotor rotates so that the second opening agrees with the first opening. The inner circumferential wall of the upper shell is disposed inside the annular portion. The inner rotor has a groove opposite the leading end of the inner circumferential wall inside the annular portion. The groove has a width larger than the thickness of the leading end of the inner circumferential wall.

5 Claims, 18 Drawing Sheets

DISK CARTRIDGE WITH AN INNER ROTOR

CROSS-REFERENCE TO RELATED APPLICATIONS

The present application claims priority to Japanese Patent Application JP 2005-089495 filed in the Japanese Patent Office on Mar. 25, 2005, the entire contents of which is incorporated herein by reference.

BACKGROUND

The present invention relates to disk cartridges that can accommodate a disk serving as a recording media and expose it by opening a pair of shutter members.

Disk-shaped recording media are exemplified by write-once or rewritable optical disks for recording and playback of information such as audio data, video data, and computer data and playback-only optical disks. Such optical disks are rotatably accommodated in cartridge cases because the adhesion of foreign matter such as dust and fingerprints to a signal recording surface impairs reliable recording and playback of data. A typical disk cartridge includes, for example, a cartridge case rotatably accommodating an optical disk and having an opening for recording and/or playback which is closed by shutter members. These shutter members move and open the opening only when the disk cartridge is inserted into a recording and/or playback device.

Referring to FIGS. 25 and 26, a disk cartridge 201 as disclosed in Japanese Unexamined Patent Application Publication Nos. 2001-332054 and 2002-50147, for example, includes a cartridge case 202 including an upper shell 202a, a lower shell 202b coupled thereto, an inner rotor 204 rotatably holding an optical disk 203 in the cartridge case 202, an opening 206 provided in the lower shell 202b of the cartridge case 202, and a pair of shutter members 205a and 205b that are opened to expose the optical disk 203 through the opening 206 in recording and/or playback. As the inner rotor 204 is rotated in one direction in the cartridge case 202 of the disk cartridge 201, the shutter members 205a and 205b move and close the opening 206 of the lower shell 7 to protect the optical disk 203. As the inner rotor 204 is rotated in the opposite direction, the shutter members 205a and 205b move and open the opening 206 to expose the optical disk 203 through the opening 206 for recording and/or playback.

FIG. 27 illustrates the relative positions of the upper shell 202a, the lower shell 202b, the inner rotor 204, and the optical disk 203. The upper shell 202a has a substantially rectangular main surface portion, an outer circumferential wall 211 on the periphery of the main surface portion, an inner circumferential wall 212 inside the outer circumferential wall 211, and a guide groove 213 for guiding the inner rotor 204 between the circumferential walls 211 and 212. The main surface portion has a substantially arc-shaped front end which is inserted into a recording/playback device. The lower shell 202b, which is coupled to the upper shell 202a, has a substantially rectangular main surface portion and an outer circumferential wall 214 on the periphery of the main surface portion. The main surface portion has a substantially arc-shaped front end which is inserted into a recording/playback device. The inner rotor 204 has a substantially circular main surface portion 215 and an annular portion 216 disposed on the periphery thereof. The main surface portion 215 and the annular portion 216 form a space for accommodating the optical disk 203.

The upper shell 202a and the lower shell 202b are coupled with the outer circumferential walls 211 and 214 butting against each other. The inner rotor 204 is rotatably disposed inside the outer circumferential wall 214 of the lower shell 7 such that the leading end of the annular portion 216 engages with the guide groove 213 of the upper shell 202a. The inner circumferential wall 212 of the upper shell 202a is positioned inside the annular portion 216 so as to surround the space accommodating the optical disk 203. The inner circumferential wall 212 has such a height that a predetermined gap 217 is left between the leading end of the inner circumferential wall 11 and the main surface portion of the inner rotor 204. The gap 217 ensures that the inner circumferential wall 212 does not come into contact with the inner rotor 204 or interfere with the rotation thereof.

Referring to FIG. 28, a large impact resulting when, for example, the disk cartridge 201 is accidentally dropped may bend the upper shell 202a and the lower shell 202b and thus deform the space accommodating the inner rotor 204 in the cartridge case 202. If such deformation widens the gap 217 to larger than the thickness of the optical disk 203, the rim of the optical disk 203 may squeeze between the leading end of the inner circumferential wall 212 and the main surface portion 215 of the inner rotor 204.

If the rim of the optical disk 203 squeezes into the gap 217, the inner rotor 204 is, for example, pressed against the lower shell 202b and thus no longer rotates. As a result, the pair of shutter members 205a and 205b, which rotate as the inner rotor 204 rotates, pose difficulty in opening the opening 206 for the recording or playback of the optical disk 203. In addition, the inner rotor 204 pressed against the lower shell 202b deforms the lower shell 202b and causes a gap between the lower shell 202b and the shutter members 205a and 205b around the opening 206. This gap promotes the intrusion of foreign matter such as dust into the cartridge case 202 and results in damage to the optical disk 203.

The optical disk 203, on which information signals are densely recorded, have fine spots formed by focusing a short-wavelength light beam using an objective lens with high numerical aperture in close proximity to the optical disk 203. If, for example, the disk cartridge 201 deforms and causes a gap between the inner rotor 204 and the shutter members 205a and 205b, foreign matter such as dust can intrude into the cartridge case 202 and adhere to the optical disk 203. Such foreign matter may obstruct accurate recording/playback of information signals and contaminate the optical disk 203 and the objective lens.

SUMMARY

Accordingly, it is desirable to provide a disk cartridge capable of preventing foreign matter such as dust from adhering to a disk accommodated therein.

It is also desirable to provide a disk cartridge that can prevent an optical disk accommodated therein from squeezing between an inner rotor and an upper shell when, for example, the cartridge deforms on impact, and thus can prevent the intrusion of foreign matter due to deformation to protect the optical disk.

A disk cartridge according to an embodiment of the present invention includes a cartridge case including an upper shell and a lower shell coupled thereto; an inner rotor rotatably disposed in the cartridge case to rotatably accommodate a disk; and shutter members disposed between the inner rotor and the lower shell and rotatably attached to the inner rotor. The upper shell has an outer circumferential wall and an inner circumferential wall inside the outer circumferential wall. The lower shell has a first opening for recording and/or playback. The inner rotor has a second opening corresponding to the first opening and an annular portion on the periphery of the inner rotor. The inner circumferential wall of the upper shell is disposed inside the annular portion. The inner rotor has a groove opposite the leading end of the inner circumferential wall inside the annular portion. The groove has a width larger than the thickness of the leading end of the inner circumferential wall. The shutter members are opened to expose the disk accommodated in the inner rotor through the first and second openings when the inner rotor rotates so that the second opening agrees with the first opening.

According to the embodiment of the present invention, as described above, the groove is disposed opposite the leading end of the inner circumferential wall of the upper shell inside the annular portion of the inner rotor. This groove has a width larger than the thickness of the leading end of the inner circumferential wall. If the cartridge case deforms, the inner circumferential wall enters the groove to prevent the disk from squeezing between the inner circumferential wall and the inner rotor and thus avoid the intrusion of, for example, dust into the cartridge case, thereby protecting the disk.

Additional features and advantages are described herein, and will be apparent from, the following Detailed Description and the figures.

DETAILED DESCRIPTION

Figure 1:
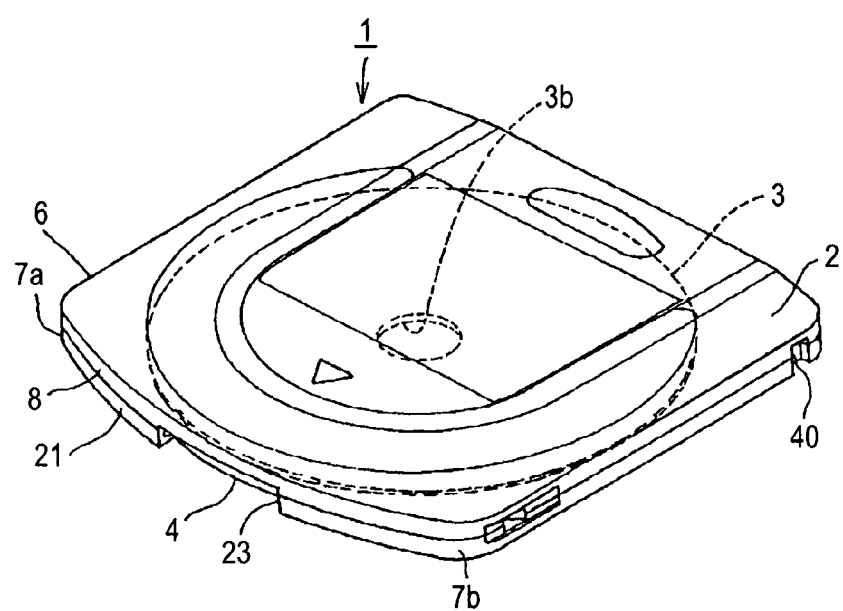
FIG. 1 is a top perspective view of a disk cartridge according to an embodiment of the present invention.
Figure 2:
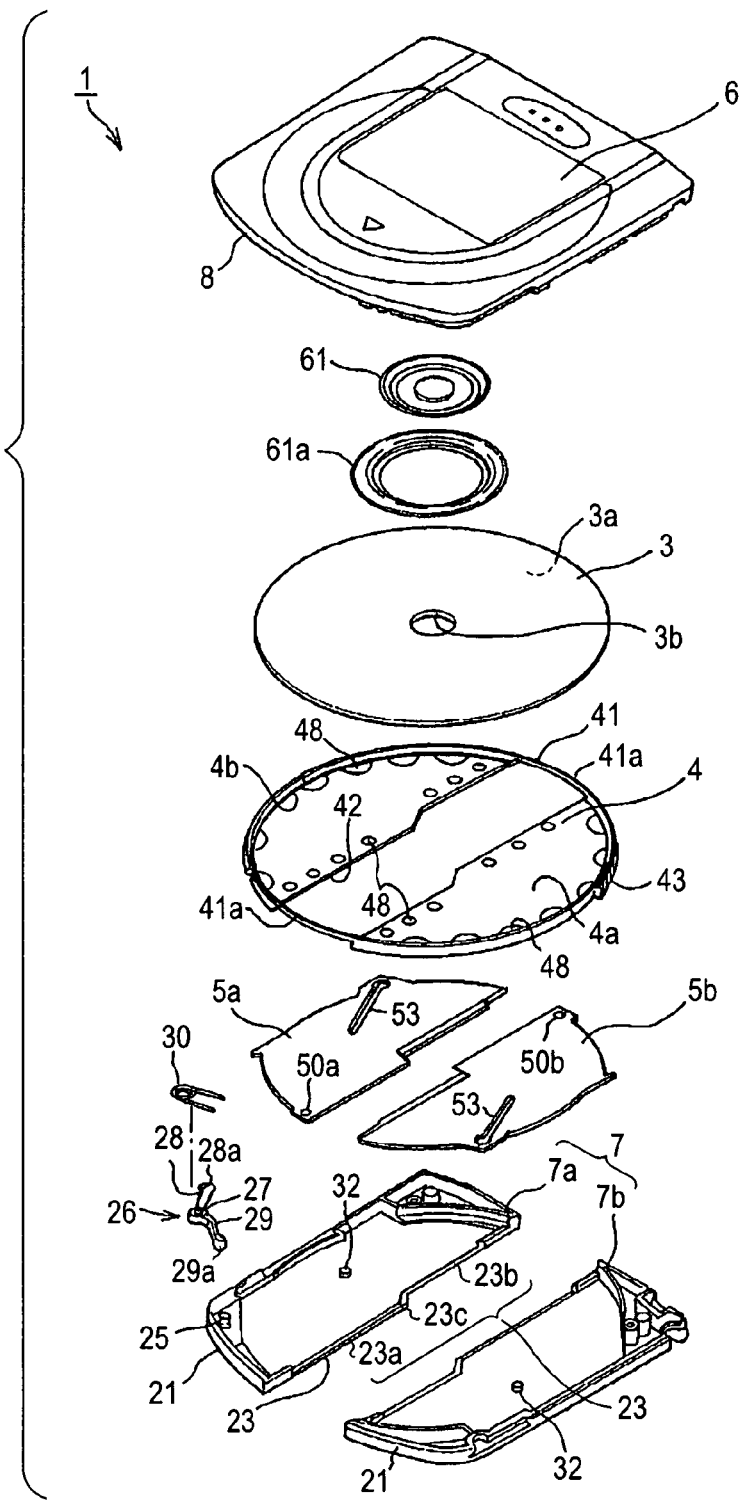
FIG. 2 is an exploded perspective view of the disk cartridge.
Figure 3:
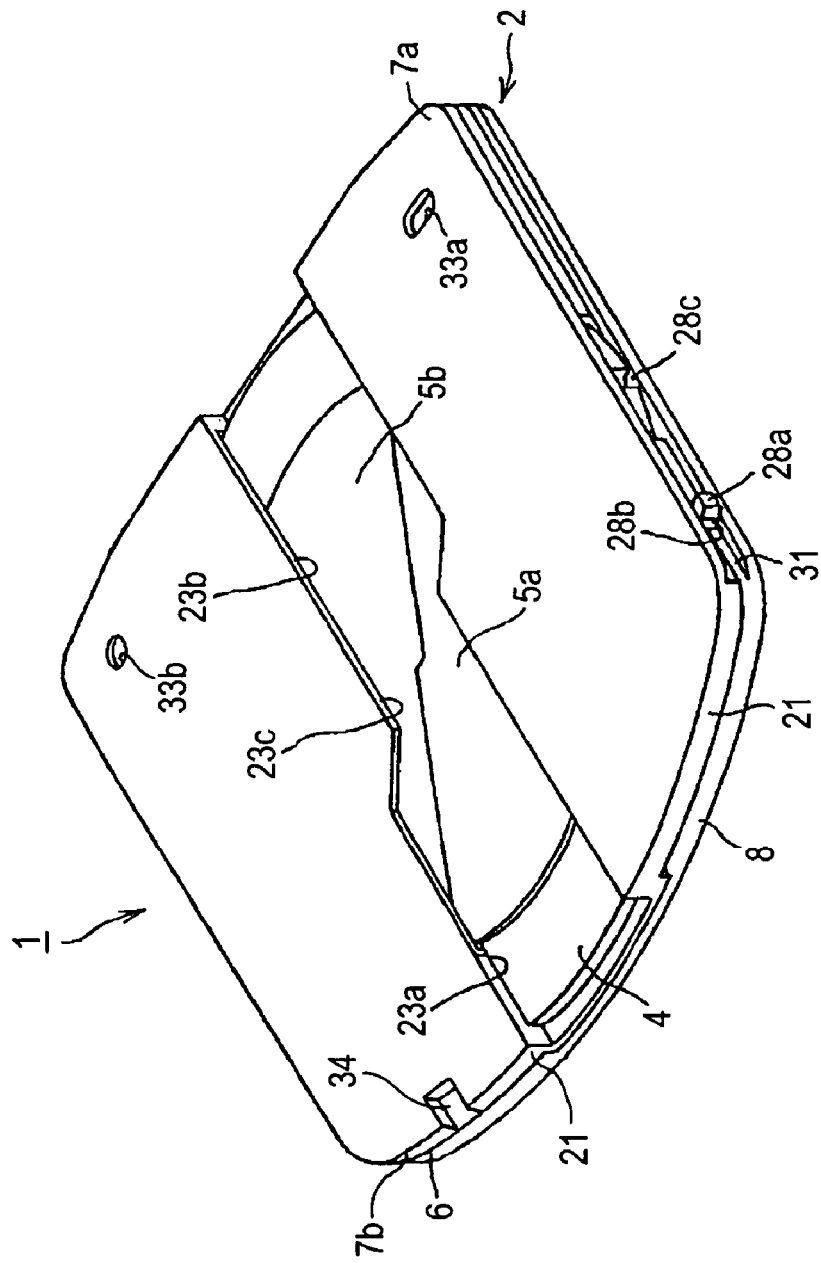
FIG. 3 is a bottom partial sectional view of the disk cartridge.

A disk cartridge according to an embodiment of the present invention will now be described with reference to the drawings. Referring to FIGS. 1 to 3, a disk cartridge 1 according to this embodiment includes a cartridge case 2 rotatably accommodating an optical disk 3 serving as a recording medium. The cartridge case 2 also includes an inner rotor 4 for rotatably accommodating the optical disk 3 and a pair of shutter members 5a and 5b.

The optical disk 3 accommodated in the disk cartridge 1 has, for example, the same diameter as CDs and DVDs, namely 12 cm, and has a central hole 3b that engages with a disk-rotating mechanism of a recording/playback device (not shown).

This optical disk 3 is formed of a synthetic resin substrate with a signal recording surface 3a that is irradiated with a light beam. A predetermined pattern of lands and grooves is formed on the signal recording surface 3a. The predetermined pattern is covered with a reflective layer for reflecting a light beam, a signal recording layer formed of, for example, a phase-change material or an organic dye, and a transparent layer in the above order. A light beam passes through the transparent layer to record data on the lands and/or the grooves. A light beam with a wavelength of about 400 nm may be used for recording and/or playback together with an optical pickup including an objective lens with a higher numerical aperture than those used for CDs and DVDs to record data such as still image data, motion image data, audio data, and data to be processed in computers more densely than CDs and DVDs. Other types of disks may also be accommodated, including magneto-optical disks, magnetic disks, read-only optical disks, and cleaning disks.

The cartridge case 2 has an opening for recording and/or playback extending from the front to rear thereof. When the disk cartridge 1 is inserted into the recording/playback device, the opening allows two optical pickups to enter the cartridge case 2 from the front and rear sides thereof to record or play back information signals at high speed.

The cartridge case 2 includes an upper shell 6 and a lower shell 7 coupled thereto.

Figure 4:
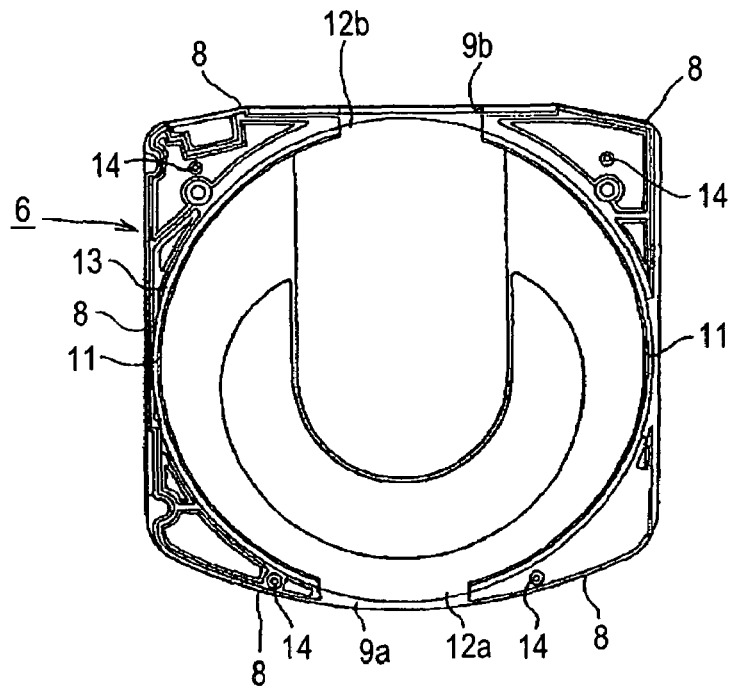
FIG. 4 is a plan view of the inside of an upper shell of the disk cartridge.

The upper shell 6, which constitutes the top surface of the cartridge case 2, is formed by injection molding with a thermoplastic resin such as acrylonitrile butadiene styrene (ABS) and polycarbonates. Referring to FIG. 4, the upper shell 6 has a substantially rectangular main surface and a substantially arc-shaped front end which is inserted into the recording/playback device. The upper shell 6 includes an outer circumferential wall 8 on the periphery of the main surface thereof to constitute part of the side surfaces of the cartridge case 2. The outer circumferential wall 8 has a first front gateway 9a in the center of the front side thereof and a first rear gateway 9b in the center of the rear side thereof. The first front gateway 9a allows a first optical pickup of the recording/playback device to enter the cartridge case 2. The first rear gateway 9b allows a second optical pickup of the recording/playback device to enter the cartridge case 2.

The upper shell 6 also includes a substantially annular inner circumferential wall 11 inside the outer circumferential wall 8. This inner circumferential wall 11 surrounds a space for rotatably accommodating the optical disk 3. The inner circumferential wall 11 has a second front gateway 12a in the center of the front side thereof and a second rear gateway 12b in the center of the rear side thereof. The second front gateway 12a allows the first optical pickup of the recording/playback device to enter the cartridge case 2. The second rear gateway 12b allows the second optical pickup of the recording/playback device to enter the cartridge case 2. The inner circumferential wall 11 serves as sidewalls surrounding the space accommodating the optical disk 3 on the inner rotor 4. Another circumferential wall is disposed outside the inner circumferential wall 11 so as to surround it, and they define a substantially annular guide groove 13 which rotatably engages with the inner rotor 4.

The upper shell 6 also includes positioning pins 14 for coupling the lower shell 7 to the upper shell 6 near the corners thereof. Each of the positioning pins 14 has a screw hole in the center thereof.

Figure 5:
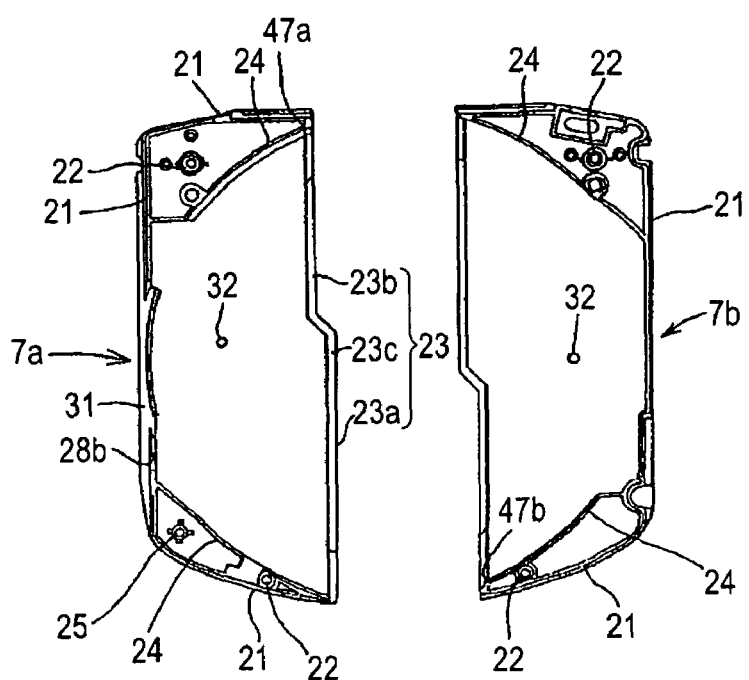
FIG. 5 is a plan view of the inside of a lower shell of the disk cartridge.

The lower shell 7, as shown in FIGS. 2, 3, and 5, is separated in lower shell halves 7a and 7b which are coupled to the upper shell 6 to constitute the bottom surface of the cartridge case 2 (the lower shell halves 7a and 7b are also collectively referred to as the lower shell 7). The lower shell 7, as well as the upper shell 6, is formed by injection molding with a thermoplastic resin such as ABS and polycarbonates. The lower shell halves 7a and 7b have substantially arc-shaped front ends corresponding to the front end of the upper shell 6. The lower shell halves 7a and 7b include outer circumferential walls 21 on the peripheries of the main surfaces thereof to constitute part of the side surfaces of the cartridge case 2. The lower shell halves 7a and 7b also include substantially arc-shaped corner walls 24 at the corners thereof. When the lower shell halves 7a and 7b are coupled to the upper shell 6, the corner walls 24 are positioned outside the inner circumferential wall 11 of the upper shell 6 to prevent the intrusion of foreign matter into the space accommodating the optical disk 3. The lower shell half 7a has a spindle 25 at the front corner thereof to rotatably support a lock member 26.

The lower shell 7 also includes substantially cylindrical positioning caps 22 for being fitted to the positioning pins 14 of the upper shell 6. These positioning caps 22 have through-holes in the bottom surfaces thereof into which set screws are threaded. The positioning pins 14 of the upper shell 6 are fitted to the positioning caps 22 of the lower shell halves 7a and 7b with the outer circumferential walls 8 and 21 butting against each other. The set screws are then threaded into the screw holes of the positioning pins 14 through the through-holes of the positioning caps 22 to couple the upper shell 6 to the lower shell halves 7a and 7b, thus constituting the cartridge case 2 with the inner rotor 4 accommodated therein.

A first opening 23 for recording and/or playback is defined between the lower shell halves 7a and 7b on the bottom surface of the cartridge case 2. The first opening 23 includes a front opening part 23a through which the first optical pickup of the recording/playback device enters the cartridge case 2, a rear opening part 23b through which the second optical pickup enters the cartridge case 2, and a central opening part 23c for disc rotation between the opening parts 23a and 23b in substantially the center of the bottom surface of the cartridge case 2. The opening parts 23a and 23b have a size sufficient to allow the optical pickups to enter the cartridge case 2 while the opening part 23c has a size sufficient to allow a disc table of the disc rotation mechanism to enter the cartridge case 2.

The lock member 26 is disposed at the front corner of the lower shell half 7a. This lock member 26 locks the rotation of the inner rotor 4 while the first opening 23 of the cartridge case 2 is closed by the inner rotor 4 and the pair of shutter members 5a and 5b. In FIG. 2, the lock member 26 has a spindle hole 27 that rotatably engages with the spindle 25 at the front corner of the lower shell half 7a, an operating portion 28 extending from the spindle hole 27 toward a side surface of the cartridge case 2, and a lock portion 29 extending toward the inner rotor 4.

In FIGS. 2 and 5, the operating portion 28 has an operating protrusion 28a at the leading end thereof which is exposed through a lock opening 28b formed at the side surface of the cartridge case 2. The lock portion 29 has a lock protrusion 29a at the leading end thereof which comes into sliding contact with a substantially annular portion 41 of the inner rotor 4.

In addition to the lock member 26, a biasing member 30, such as a torsion coil spring, is attached to the spindle 25 with an arm thereof engaging with the outer circumferential wall 21 and the other arm engaging with the lock member 26. This biasing member 30 rotates the lock member 26 toward the inner rotor 4 so that the lock protrusion 29a engages with a second engaging notch 45 of the inner rotor 4. When the operating protrusion 28a of the operating portion 28 is pushed against the biasing force of the biasing member 30, the lock portion 29 moves away from the annular portion 41 of the inner rotor 4 to unlock the engagement of the lock protrusion 29a with the second engaging notch 45.

Referring to FIG. 3, the cartridge case 2 has a guide groove 31 extending from front to rear along the side surface thereof to prevent the misinsertion of the disk cartridge 1 into the recording/playback device. The lock opening 28b is formed in the bottom surface of the guide groove 31 on the front side thereof to expose the operating protrusion 29a of the lock member 26. In addition, a rotor opening 28c is formed in the bottom surface of the guide groove 31 on the rear side thereof to expose the rim of the inner rotor 4.

Substantially cylindrical guide pins 32 are disposed on the inner surface of the lower shell 7. These guide pins 32 engage with elongated guide holes 53 provided in the shutter members 5a and 5b. When the shutter members 5a and 5b rotate about spindle holes 50a and 50b thereof, respectively, the guide pins 32 move in the guide holes 53 along the length thereof to guide the shutter members 5a and 5b so that they open and close the first opening 23.

Figure 6:
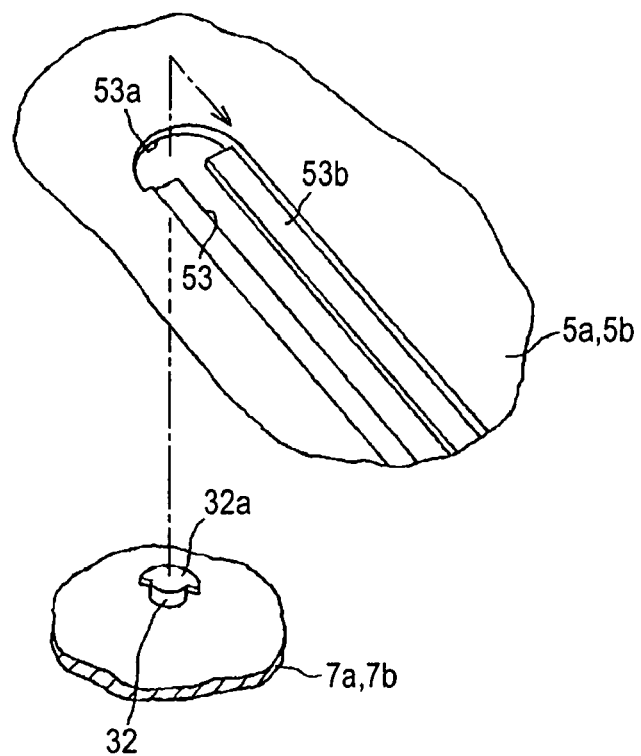
FIG. 6 is a partial perspective view of a guide pin and a guide hole.

Referring to FIG. 6, the guide pins 32 each have a wide portion 32a at the leading end thereof to prevent the detachment of the guide pins 32 from the guide holes 53 of the shutter members 5a and 5b. This wide portion 32a is formed in a substantially semicircular shape to facilitate mold releasing after injection molding.

Positioning holes 33a and 33b, as shown in FIG. 3, are disposed in the bottom surface of the cartridge case 2, that is, in the lower shell 7, to position the disk cartridge 1 when the disk cartridge 1 is inserted into the recording/playback device. One positioning hole 33a is formed in an oval shape and serves as an alignment hole. The other positioning hole 33b is formed in the shape of a perfect circle and serves as a location hole. A notch 34 is formed across the edge between the front and bottom surfaces of the cartridge case 2 at a front corner thereof to distinguish the disk cartridge 1 from other types of disk cartridges that have substantially the same external shape as the disk cartridge 1 but differ in the type of recording format. The notch 34 may of course be used as a guide or positioning notch with which a guide pin engages when the disk cartridge 1 is inserted into the recording/playback device.

Figure 7:
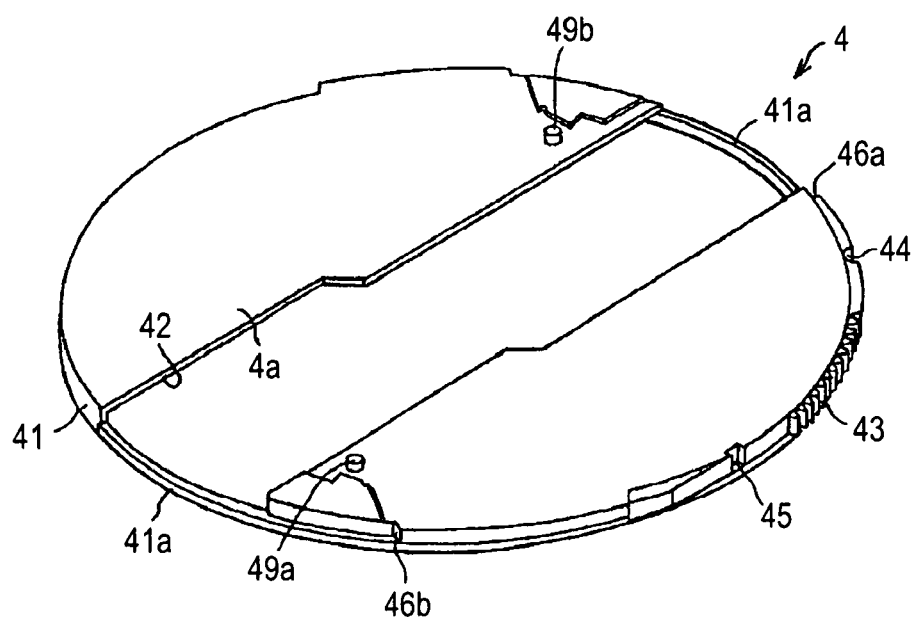
FIG. 7 is a perspective view of an inner rotor of the disk cartridge.

Referring to FIG. 7, the inner rotor 4, which is accommodated in the cartridge case 2, is formed by injection molding with a thermoplastic resin such as polyoxymethylene (POM). The inner rotor 4 has a main surface portion 4a on which the optical disk 3 is placed with the signal recording surface 3a thereof facing the main surface portion 4a. When the inner rotor 4 is disposed in the cartridge case 2, as shown in FIG. 8, the main surface portion 4a thereof and the inner circumferential wall 11 of the upper shell 6 provide the space for accommodating the optical disk 3.

The inner rotor 4 is formed in a substantially circular shape and has the annular portion 41 on the periphery thereof. The inner rotor 4 is rotatably attached to the cartridge case 2 with the annular portion 41 engaging with the guide groove 13 of the upper shell 6.

Figure 8:
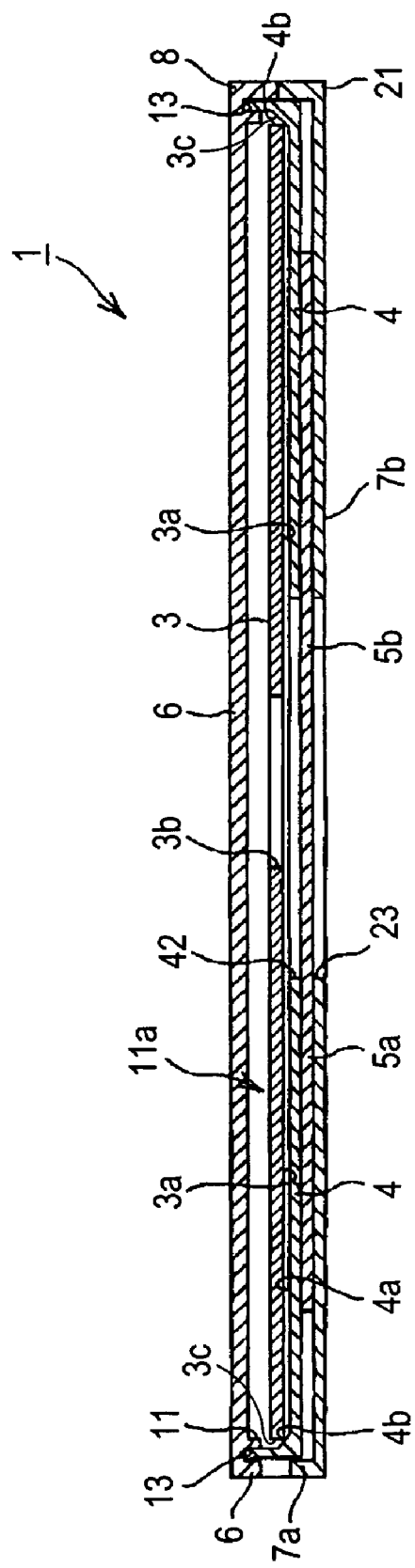
FIG. 8 is a sectional view of the disk cartridge.

Referring to FIG. 8, the inner rotor 4 has a tapered portion 4b along the corner between the annular portion 41 and the main surface portion 4a; the optical disk 3 is placed above the main surface portion 4a with only the rim 3c thereof being in contact with the tapered portion 4b of the inner rotor 4. The tapered portion 4b thus prevents the signal recording surface 3a of the optical disk 3 from butting against the main surface portion 4a so that the inner rotor 4 can support the optical disk 3 without damaging the signal recording surface 3a.

In FIG. 7, the inner rotor 4 has a second opening 42 with substantially the same size as the first opening 23 of the lower shell 7. The second opening 42 separates the annular portion 41 in halves that are coupled by coupling portions 41a.

Figure 9:
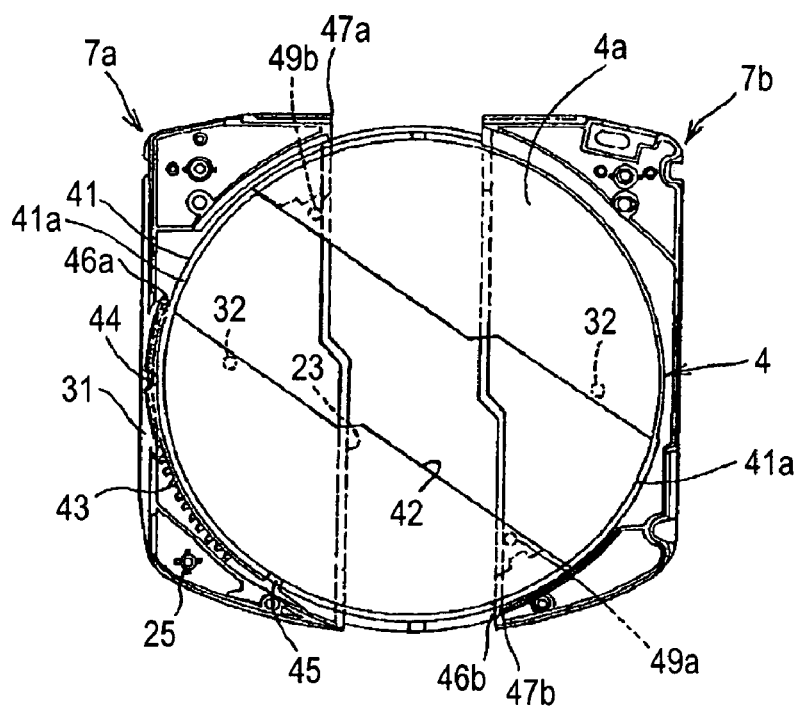
FIG. 9 is a plan view illustrating a state where the inner rotor closes an opening of the lower shell.
Figure 10:
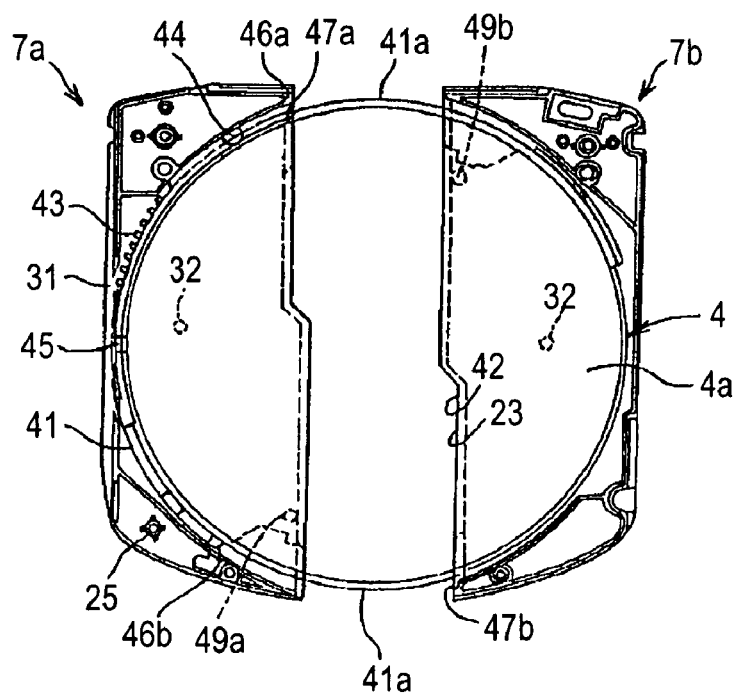
FIG. 10 is a plan view illustrating a state where the inner rotor opens the opening of the lower shell.

A gear portion 43 for rotating the inner rotor 4 is disposed on the outer circumferential surface of the annular portion 41. This gear portion 43 is formed between a position where the inner rotor 4 is exposed through the rotor opening 28c on the front side thereof when the inner rotor 4 closes the first opening 23 of the lower shell 7, as shown in FIG. 9, and a position where the inner rotor 4 is exposed through the rotor opening 28c on the rear side thereof when the inner rotor 4 opens the first opening 23 of the lower shell 7, as shown in FIG. 10.

In FIG. 7, a first engagement notch 44 is formed on one side of the gear portion 43 to engage with a first engagement protrusion of a shutter-opening member of a shutter-opening mechanism of the recording/playback device. The second engagement notch 45 is formed on the other side of the gear portion 43 to engage with a second engagement protrusion of the shutter-opening member. These engagement notches 44 and 45, as well as the gear portion 43, are exposed through the rotor opening 28c. The first engagement notch 44 engages with the first engagement protrusion of the shutter-opening member when the disk cartridge 1 is inserted into the recording/playback device. The second engagement notch 45 engages with the lock portion 29 of the lock member 26 when the shutter members 5a and 5b close the openings 23 and 42, and engages with a second engaging protrusion of the shutter-opening member when the shutter members 5a and 5b move and open the openings 23 and 42.

A pair of rotation-limiting protrusions 46a and 46b are disposed on the outer circumferential surface of the annular portion 41 at a predetermined interval to limit the amount of rotation of the inner rotor 4. On the other hand, a pair of limiting portions 47a and 47b are disposed on the lower shell 7. The limiting portions 47a and 47b butt against the rotation-limiting protrusions 46a and 46b, respectively. When the inner rotor 4 rotates in a direction in which it opens the first opening 23, as shown in FIG. 10, the rotation-limiting protrusion 46a butts against the limiting portion 47a to limit further rotation of the inner rotor 4.

When the limiting portion 47a limits the rotation of the inner rotor 4 in that direction, the inner rotor 4 opens the first opening 23 of the cartridge case 2 substantially in agreement with the second opening 42 of the inner rotor 4. When the inner rotor 4 is rotated in a direction in which it closes the first opening 23, as shown in FIG. 9, the other rotation-limiting protrusion 46b butts against the other limiting portion 47b to limit further rotation of the inner rotor 4. When the limiting portion 47b limits the rotation of the inner rotor 4 in that direction, the inner rotor 4 closes the first opening 23 with the second opening 42 thereof being most largely inclined with respect to the first opening 23 of the cartridge case 2.

Figure 11:
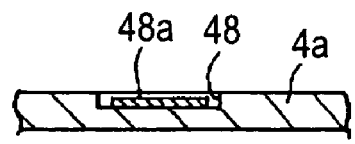
FIG. 11 is a partial sectional view of the inner rotor.

As shown in FIGS. 2 and 11, recesses 48 are formed on the inner surface of the inner rotor 4 to relieve ejection marks 48a left after injection molding. These recesses 48 have a depth larger than the height of the ejection marks 48a to protect the optical disk 3 from contact with the ejection marks 48a.

Figure 12:
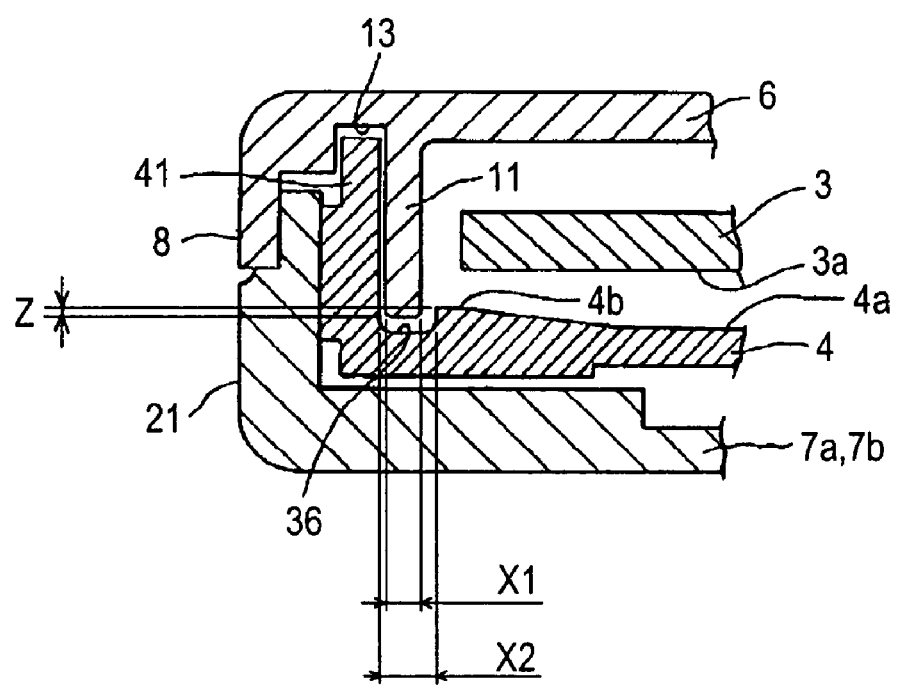
FIG. 12 is a partial sectional view illustrating the relative positions of the inner rotor and an inner circumferential wall of the upper shell.

Referring to FIG. 12, the inner circumferential wall 11 of the upper shell 6 is disposed inside the annular portion 41 of the inner rotor 4. The leading end of the inner circumferential wall 11 faces the tapered portion 4b, which is disposed on the periphery of the main surface portion 4a of the inner rotor 4. The tapered portion 4b has a groove 36 formed along the base part of the annular portion 41. The width X2 of the groove 36 is larger than the thickness X1 of the inner circumferential wall 11 of the upper shell 6. The leading end of the inner circumferential wall 11 is positioned at the same height as the top of the tapered portion 4b or in the groove 36; in the example of FIG. 12, the leading end of the inner circumferential wall 11 extends into the groove 36 by a length Z.

Even if the disk cartridge 1 is accidentally dropped and a large impact bends the cartridge case 2 and thus deforms the space accommodating the inner rotor 4, the structure described above can prevent the rim of the optical disk 3 from squeezing between the inner circumferential wall 11 and the main surface portion 4a of the inner rotor 4.

The leading end of the inner circumferential wall 11 may also be positioned above the height of the top of the tapered portion 4b. In that case, the difference in height between the leading end of the inner circumferential wall 11 and the top of the tapered portion 4b is reduced to less than the thickness of the optical disk 3 to prevent the optical disk 3 from squeezing therebetween.

The inner rotor 4, as shown in FIG. 7, also has a pair of spindles 49a and 49b disposed on the main surface opposite the annular portion 41 to rotatably support the pair of shutter members 5a and 5b. These spindles 49a and 49b are positioned symmetrically about the center of the inner rotor 4, that is, with a 180° phase shift.

Figure 13:
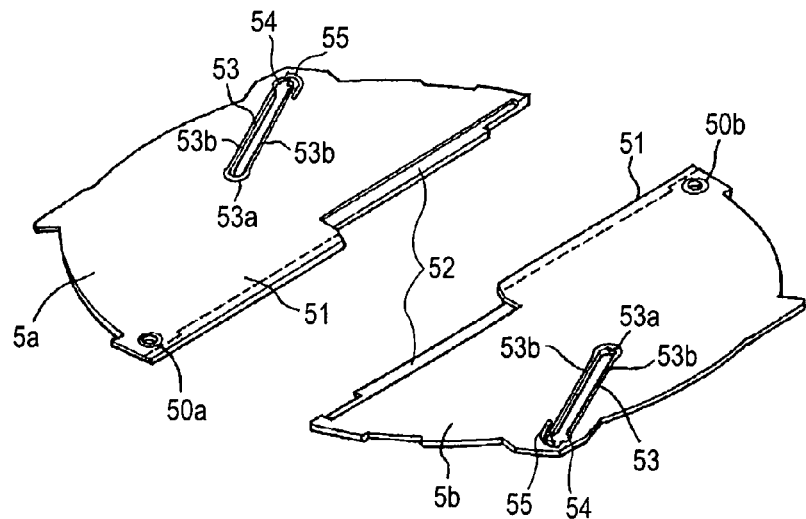
FIG. 13 is a perspective view of a pair of shutter members.
Figure 14:
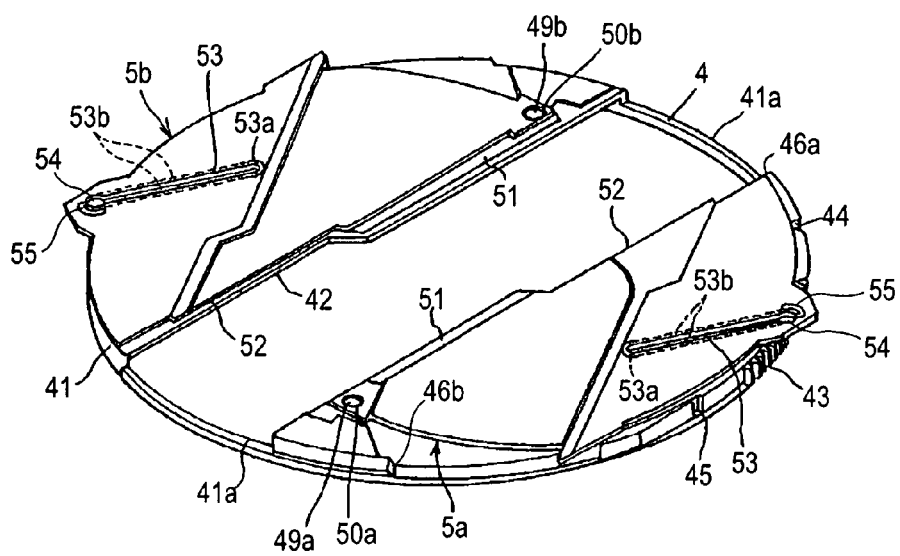
FIG. 14 is a perspective view illustrating a state where the shutter members open an opening of the inner rotor.
Figure 15:
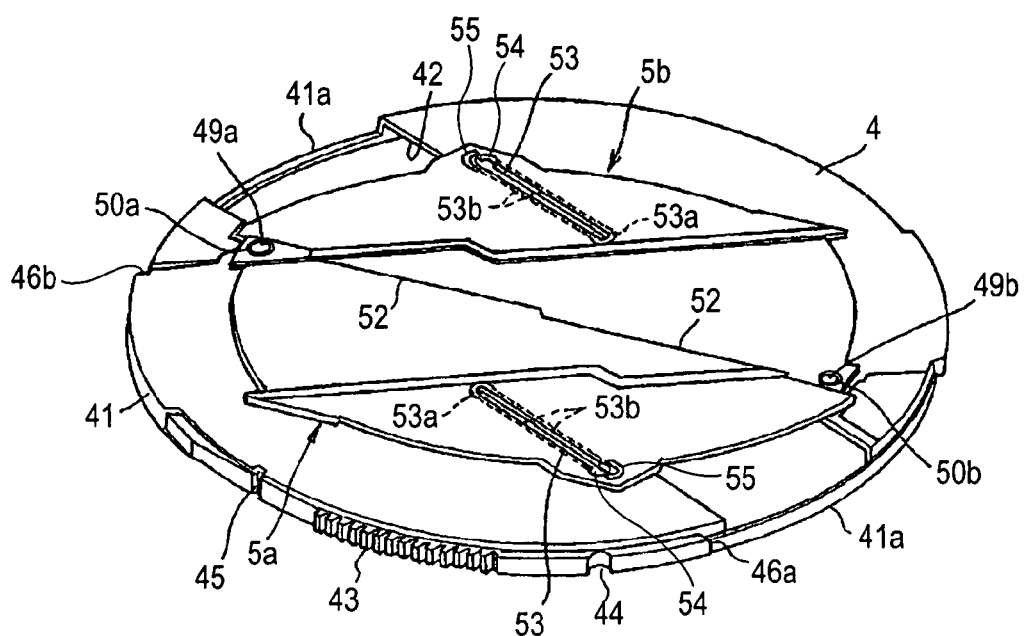
FIG. 15 is a perspective view illustrating a state where the shutter members close the opening of the inner rotor.

Referring to FIGS. 13 to 15, the shutter members 5a and 5b are symmetrically formed and are attached to the inner rotor 4 rotatably about the spindles 49a and 49b with a 180° phase shift to open and close the second opening 42. The corresponding portions of the shutter members 5a and 5b are collectively described and indicated by the same reference numerals in the drawings.

The shutter members 5a and 5b, as well as the inner rotor 4, are formed by injection molding with a thermoplastic resin such as POM. These shutter members 5a and 5b are formed in the shape of a substantially semicircular plate and have the spindle holes 50a and 50b at the base parts thereof. The spindle holes 50a and 50b rotatably engage with the spindles 49a and 49b of the inner rotor 4, respectively.

Figure 16:
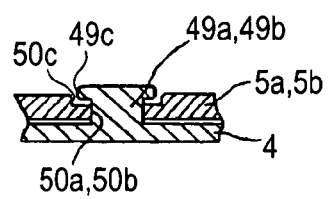
FIG. 16 is a partial sectional view illustrating how the shutter members are rotatably supported.

Referring to FIG. 16, shallow, substantially circular recesses 50c are formed around the spindle holes 50a and 50b. After the spindles 49a and 49b of the inner rotor 4 are inserted into the spindle holes 50a and 50b, respectively, the leading ends of the spindles 49a and 49b are subjected to, for example, hot crimping to form wide portions 49c for preventing the detachment of the spindles 49a and 49b. The wide portions 49c are seated in the recesses 50c so as not to increase the thickness of the cartridge case 2. In addition, the wide portions 49c come into point contact with the inner surface of the lower shell 7 to prevent the shutter members 5a and 5b from coming into contact with the lower shell 7, thus suppressing the production of, for example, dust.

The pair of shutter members 5a and 5b, as shown in FIG. 13, have first engaging portions 51 and second engaging portions 52 along chord parts which butt against each other. The first engaging portions 51 extend from the center to the base parts of the shutter members 5a and 5b while the second engaging portions 52 extend from the center to the leading ends of the shutter members 5a and 5b. The first engaging portions 51 have sloped surfaces facing downward while the second engaging portions 52 have sloped surfaces facing upward. The shutter members 5a and 5b, as shown in FIGS. 14 and 15, rotate about the spindles 49a and 49b of the inner rotor 4 so as to move closer to or farther away from each other. The first engaging portion 51 of the shutter member 5a engages with the second engaging portion 52 of the shutter member 5b while the first engaging portion 51 of the shutter member 5b engages with the second engaging portion 52 of the shutter member 5a.

The shutter members 5a and 5b also have the guide holes 53, which engage with the pair of guide pins 32 on the inner surface of the lower shell 7, as described below. These guide holes 53 have a predetermined length, extending from the arc parts of the shutter members 5a and 5b toward the spindle holes 50a and 50b. The guide holes 53 allow the shutter members 5a and 5b to rotate between the positions where they open the second opening 42 and the positions where they close the second opening 42. The guide holes 53 have engaging portions 54 and pressing portions 55 at the outer ends thereof. The engaging portions 54 engage with the guide pins 32 of the lower shell 7 when the shutter members 5a and 5b are located at the positions where they close the second opening 42. The pressing portions 55 have elasticity sufficient to press the guide pins 32 when they engage with the engaging portions 54.

The guide holes 53, as shown in FIG. 6, have insertion holes 53a for inserting the wide portions 32a of the guide pins 32. The insertion holes 53a have the size corresponding to that of the wide portion 32a. The guide pins 32 are positioned in the insertion holes 53a when the shutter members 5a and 5b completely open the openings 23 and 42 after the insertion of the disk cartridge 1 into the recording/playback device; this state undergoes few vibrations, thus preventing the detachment of the guide pins 32 from the insertion holes 53a.

Relief portions 53b for relieving the wide portions 32a of the guide pins 32 are formed on both sides of the guide holes 53, extending in the direction in which the guide pins 32 move. The relief portions 53b are stepped portions thinner than those around the guide holes 53. While the shutter members 5a and 5b rotate, the wide portions 32a engage with the relief portions 53b to prevent the detachment of the guide pins 32 from the guide holes 53. The relief portions 53b also prevent the wide portions 49c from protruding to the lower shell 7 side and coming into contact with the lower shell 7 to avoid the production of, for example, dust due to friction.

Referring back to FIG. 2, the disk cartridge 1 also has a clamping plate 61 attached to substantially the center of the inner surface of the upper shell 6 with an attachment ring 61a to hold the optical disk 3 between the clamping plate 61 and a disk table of the disc rotation mechanism of the recording/playback device. The attachment ring 61a is attached to substantially the center of the inner surface of the upper shell 6 by, for example, welding with the clamping plate 61 held between the attachment ring 61a and the upper shell 6. The disk table engages with the central hole 3b of the optical disk 3, which is rotatably held between the disk table and the clamping plate 61 in the space for accommodating the optical disk 3.

Next, a method for assembling the disk cartridge 1 will be described below. First, the annular portion 41 of the inner rotor 4 is engaged into the guide groove 13 of the upper shell 6 with the optical disk 3 placed on the main surface portion 4a of the inner rotor 4. The inner rotor 4 is positioned relative to the upper shell 6 in advance such that the second opening 42 of the inner rotor 4 agrees with the first front gateway 9a, first rear gateway 9b, second front gateway 12a, and second rear gateway 12b of the upper shell 6. The clamping plate 61 is attached to substantially the center of the inner surface of the upper shell 6 so as to engage with the central hole 3b of the optical disk 3.

The pair of shutter members 5a and 5b are then attached to the inner rotor 4. The spindle holes 50a and 50b are engaged to the spindles 49a and 49b, respectively, with the first engaging portions 51 and the second engaging portions 52 facing each other. The leading ends of the spindles 49a and 49b are subjected to hot crimping to hold the shutter members 5a and 5b rotatably about the spindles 49a and 49b.

The shutter members 5a and 5b are positioned relative to the inner rotor 4 in advance such that the engaging portions 51 and 52 are aligned with the edges of the inner rotor 4 on both sides of the second opening 42. At the same time as the positioning or before or after the positioning, additionally, the lock member 26 is attached to the lower shell 7 by inserting the spindle 25 into the spindle hole 27 of the lock member 26.

The lower shell halves 7a and 7b are then coupled to the upper shell 6. The outer circumferential walls 21 of the lower shell halves 7a and 7b are allowed to butt against the outer circumferential wall 8 of the upper shell 6, and set screws are threaded into the screw holes of the positioning pins 14 through the through-holes of the positioning caps 22. The lower shell 7 is thus coupled to the upper shell 6 to constitute the cartridge case 2 with the inner rotor 4 and the shutter members 5a and 5b being positioned so as to open the first opening 23 and the second opening 42. The shutter members 5a and 5b close the first opening 23 of the cartridge case 2 when the inner rotor 4 is rotated in a direction in which the shutter members 5a and 5b close the first opening 23 by operating the gear portion 43.

The disk cartridge 1, as described above, has a smaller number of components used and can extremely easily be assembled. In addition, the disk cartridge 1 includes no biasing member such as a coil spring and a leaf spring to allow easy assembly. The lower shell halves 7a and 7b may be integrally joined to the upper shell 6 by bonding or ultrasonic welding, rather than using set screws.

Figure 17:
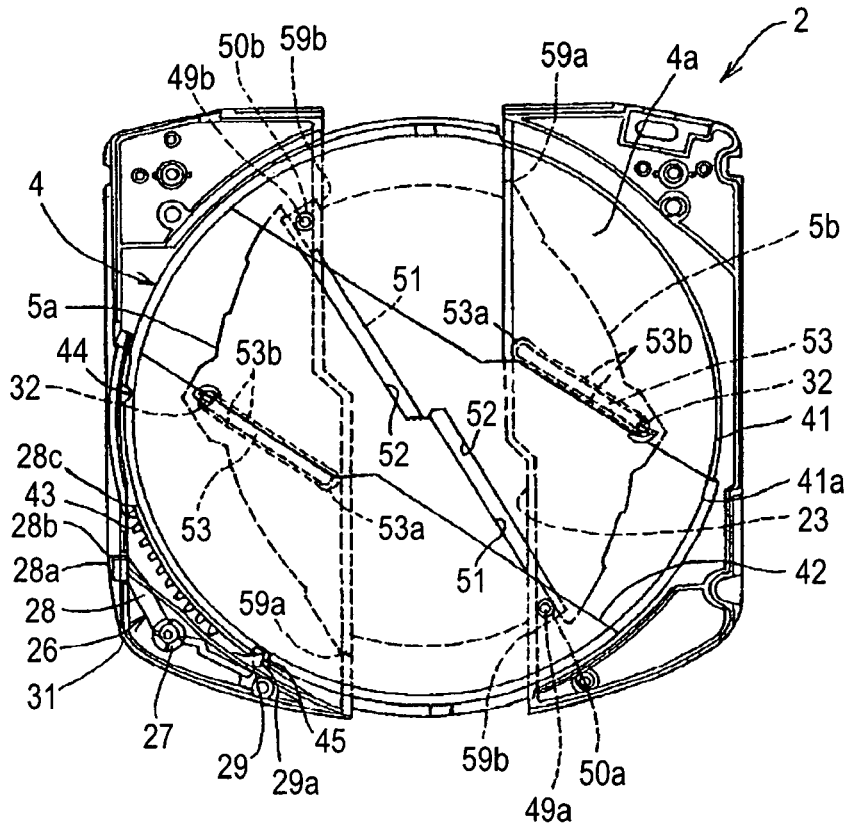
FIG. 17 is a plan view of the disk cartridge, illustrating the state where the shutter members close the opening of the inner rotor.

The disk cartridge 1 before insertion into the recording/playback device is shown in FIGS. 1, 3, and 17. The lock protrusion 29a of the lock portion 26 engages with the second engaging notch 45 of the inner rotor 4 to lock the pair of shutter members 5a and 5b at the positions where they close the first opening 23. The first engaging notch 44 of the inner rotor 4 is exposed through the rotor opening 28c, and the operating protrusion 28a of the lock member 26 is exposed through the lock opening 28b. The shutter-opening mechanism of the recording/playback device can unlock the shutter members 5a and 5b to allow the rotation thereof when the disk cartridge 1 is inserted into the recording/playback device. The disk cartridge 1 is inserted into the recording/playback device in the state described above.

Figure 18:
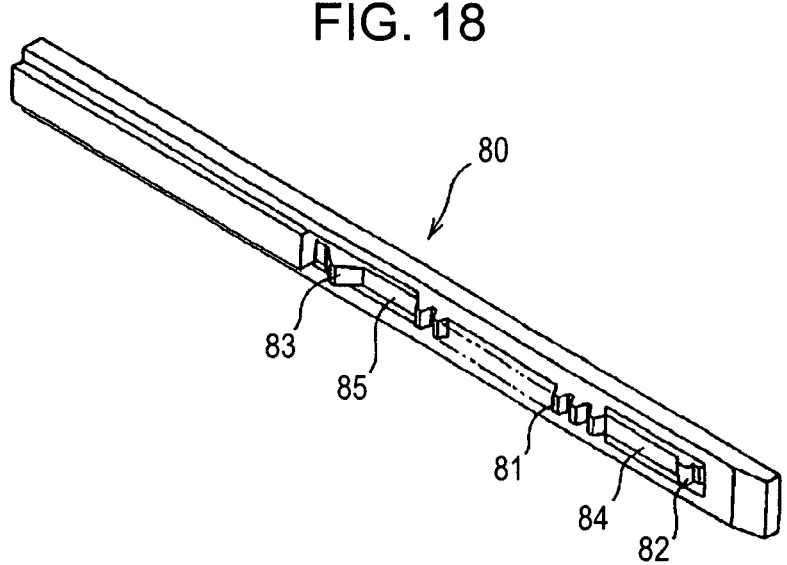
FIG. 18 is a perspective view of a shutter-opening member of a recording/playback device.

The shutter-opening mechanism of the recording/playback device includes a shutter-opening member 80 for rotating the inner rotor 4 and hence the shutter members 5a and 5b. Referring to FIG. 18, this shutter-opening member 80 has, for example, a rack portion 81 that meshes with the gear portion 43 of the inner rotor 4, a first elastic portion 84 disposed on the front side of the rack portion 81, a second elastic portion 85 disposed on the rear side of the rack portion 81, a first engaging protrusion 82 for initial operation which is disposed at the front end of the first elastic portion 84, and a second engaging protrusion 83 disposed at the rear end of the second elastic portion 85 and serving as a stopper. The rack portion 81 has substantially the same number of teeth as the gear portion 43. The first elastic portion 84 allows the first engaging protrusion 82 to reliably engage with the first engaging notch 44; the second elastic portion 85 allows the second engaging protrusion 83 to reliably engage with the second engaging notch 45.

Figure 19:
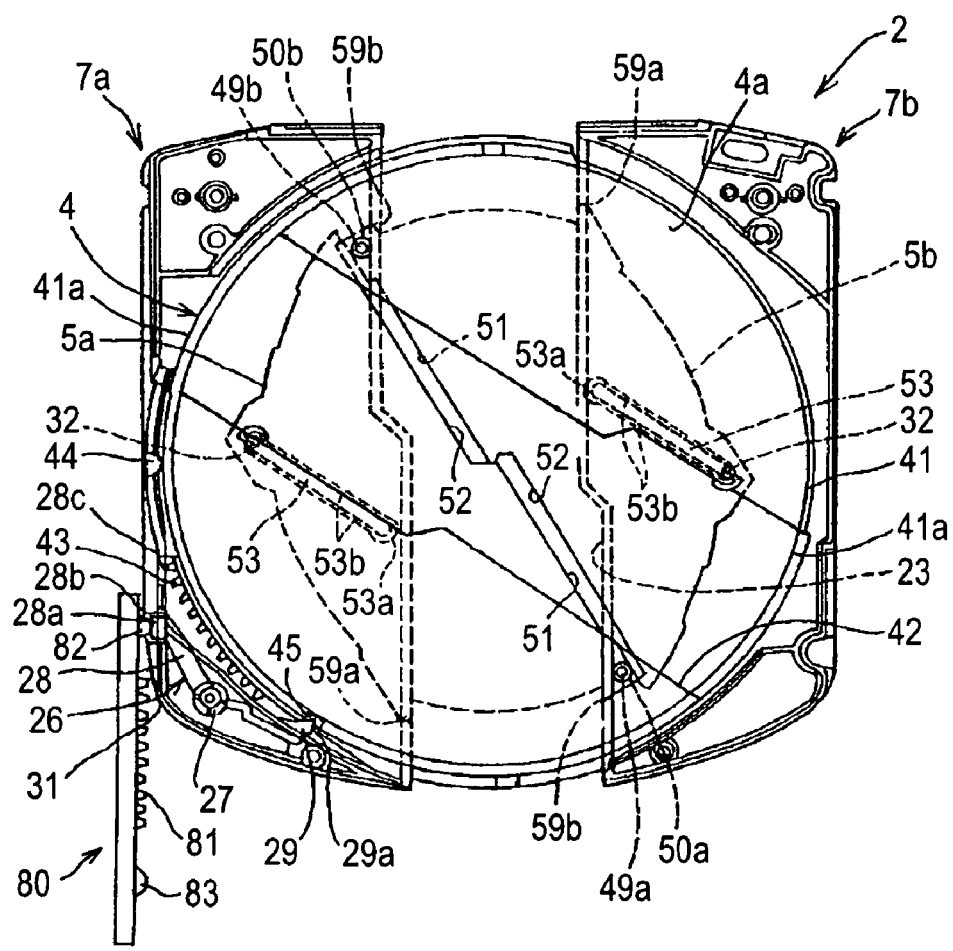
FIG. 19 is a plan view illustrating the initial stage of opening operation of the shutter-opening member.

When the disk cartridge 1 is inserted into the recording/ playback device with the substantially circular front end thereof as the leading end, the shutter-opening member 80 starts the opening operation of the shutter members 5a and 5b. Referring to FIG. 19, the shutter-opening member 80 engages with the guide groove 31 of the disk cartridge 1, and the first engaging protrusion 82 presses the operating protrusion 28a of the lock member 26, which is exposed through the lock opening 28b in the guide groove 31. The lock member 26 then rotates about the spindle 25 to release the lock protrusion 29a from the second engaging notch 45 of the inner rotor 4. The lock member 26 thus unlocks the inner rotor 4 so that it can rotate. While the shutter-opening member 80 is moving along the disk cartridge 1, the rack portion 81 continuously presses the operating protrusion 28a of the lock member 26 to keep the inner rotor 4 unlocked.

Figure 20:
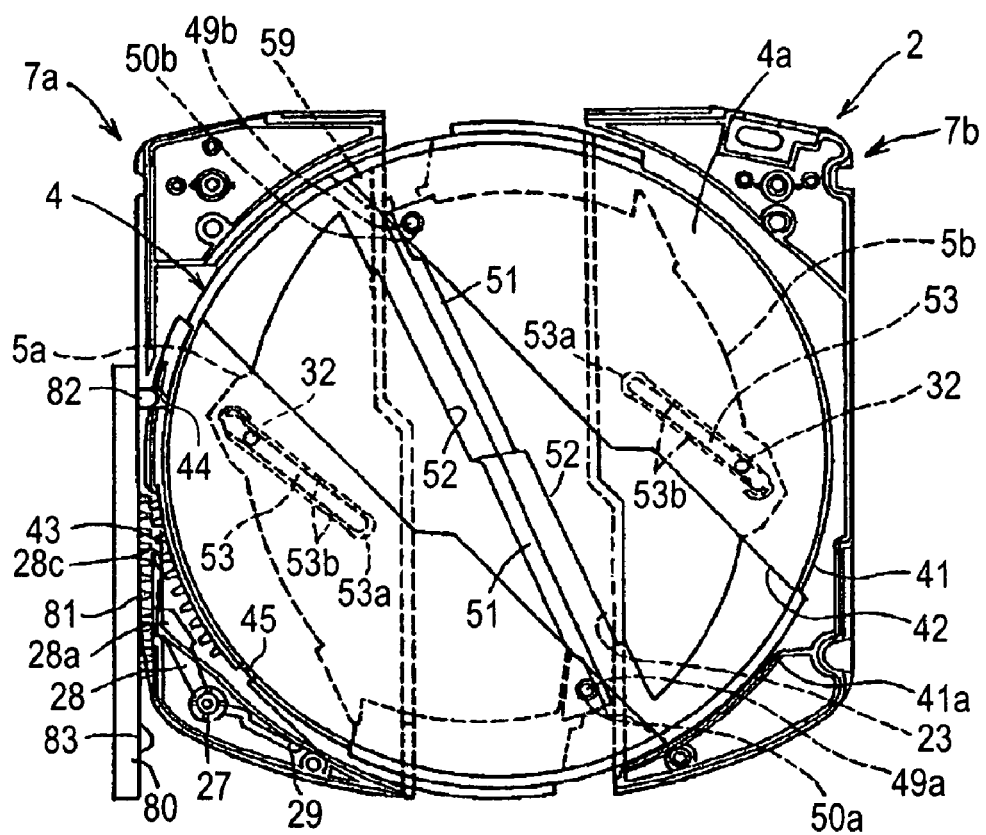
FIG. 20 is a plan view illustrating a state where a rack portion of the shutter-opening member meshes with a gear portion of the inner rotor.

Referring to FIG. 20, the first engaging protrusion 82 engages with the first engaging notch 44, which is exposed through the rotor opening 28c, so that the inner rotor 4 can rotate. The inner rotor 4 rotates as the shutter-opening member 80 moves along the disk cartridge 1. The rack portion 81 of the shutter-opening member 80 then meshes with the gear portion 43, which is exposed through the rotor opening 28c.

Figure 21:
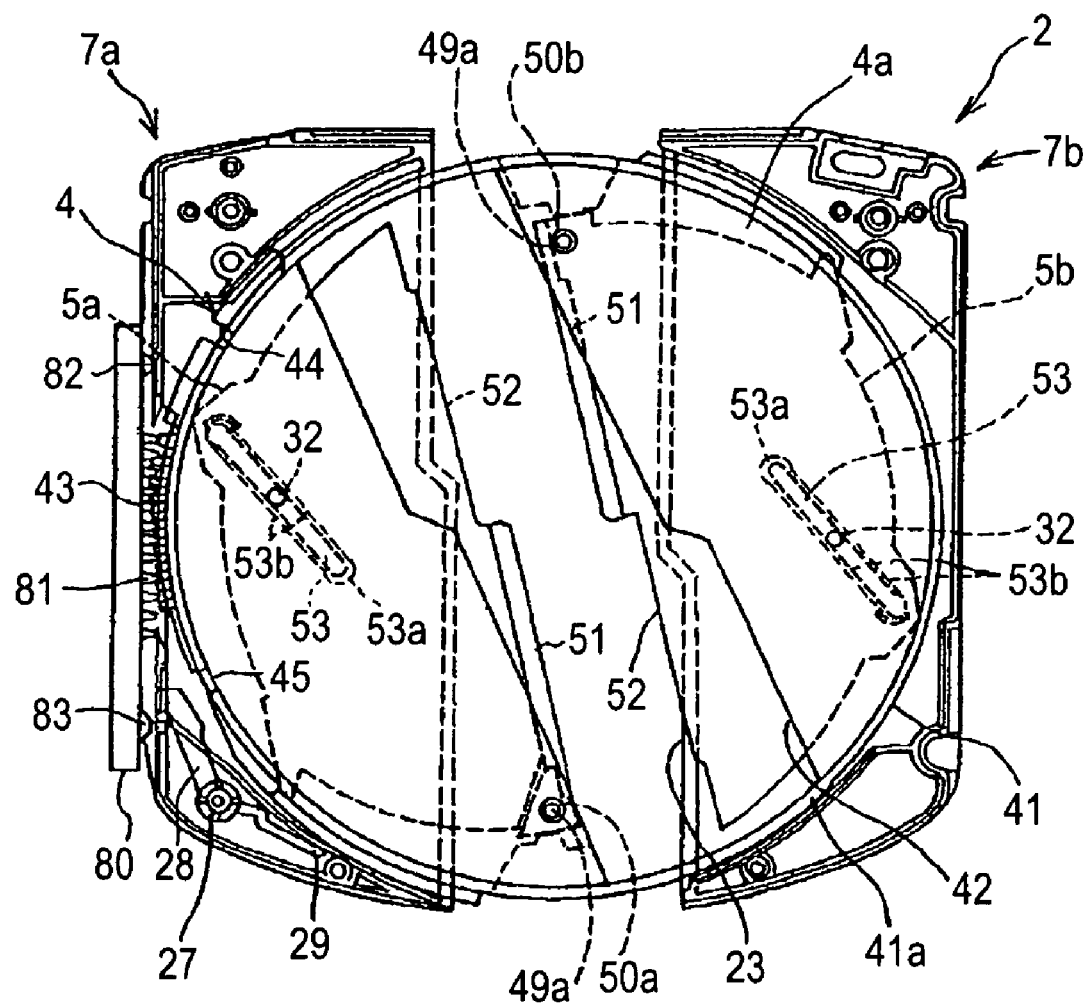
FIG. 21 is a plan view illustrating a state where the shutter members are opening the opening.

Referring to FIG. 21, the shutter-opening member 80 moves along the disk cartridge 1 while rotating the inner rotor 4 with the rack portion 81 thereof meshing with the gear portion 43 of the inner rotor 4. While the guide pins 32 of the inner rotor 4 engage with the guide holes 53, the shutter members 5a and 5b rotate about the spindles 49a and 49b, respectively, in the directions in which they open the openings 23 and 42.

Figure 22:
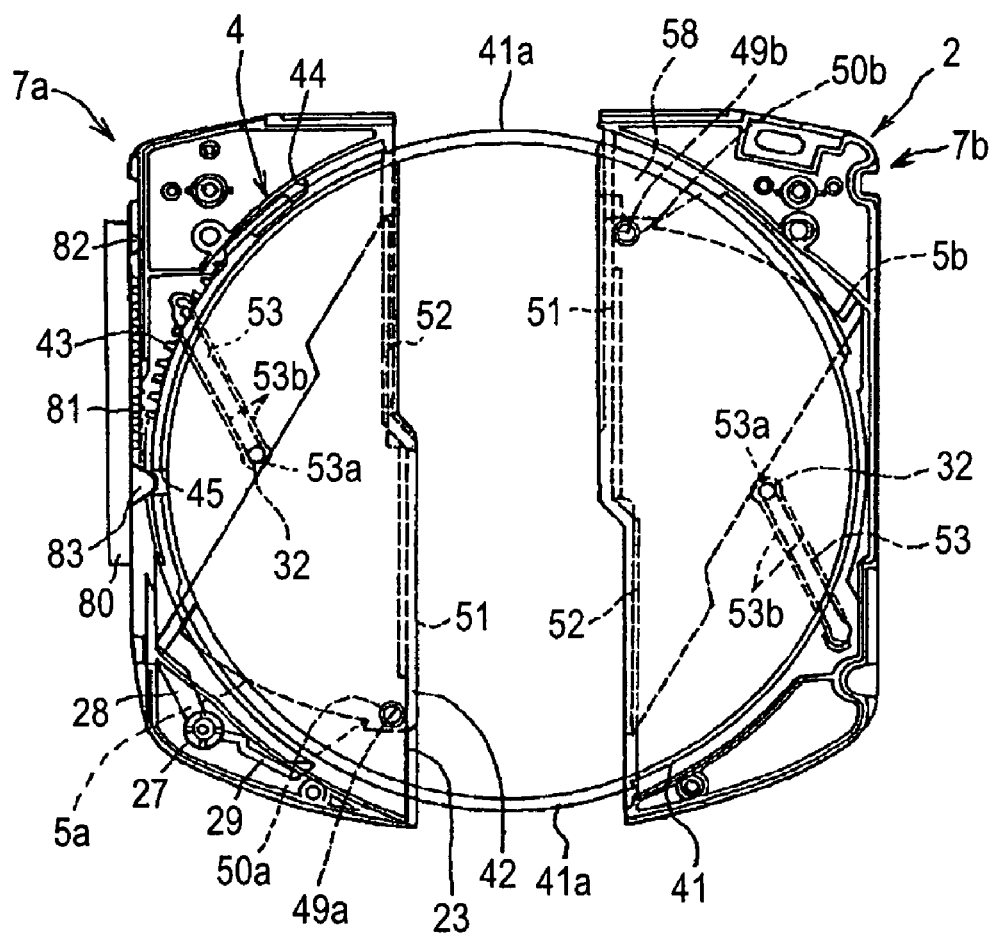
FIG. 22 is a plan view illustrating a state where the shutter members have opened the opening.

Referring to FIG. 22, the rack portion 81 of the shutter-opening member 80 moves out of meshing engagement with the gear portion 43 of the inner rotor 4, and accordingly the shutter members 5a and 5b no longer rotate. The second engaging protrusion 83 of the shutter-opening member 80 then engages with the second engaging notch 45 of the inner rotor 4 to keep the openings 23 and 42 completely opened by the shutter members 5a and 5b.

Subsequently, the disk table of the disc rotation mechanism enters the disk cartridge 1 through the first opening 23 to engage with the central hole 3b of the optical disk 3, which is rotatably clamped between the disk table and the clamping plate 61. In addition, an optical pickup enters the disk cartridge 1 from the front and/or rear of the first opening 23. While the disc rotation mechanism rotates the optical disk 3, the optical pickup records or plays back data on the optical disk 3 by irradiating the signal recording surface 3a with a light beam and detecting the light beam reflected by the signal recording surface 3a.

The disk cartridge 1 is ejected from the recording/playback device by, for example, pressing an eject button on an operating part of the recording/playback device. Pressing the eject button causes a loading mechanism to eject the disk cartridge 1. The shutter-opening member 80 then moves backward relative to the disk cartridge 1 to execute the reverse operation; the inner rotor 4 rotates in the reverse direction so that the shutter members 5a and 5b close the first opening 23 of the cartridge case 2.

In the disk cartridge 1, as shown in FIG. 12, the inner rotor 4 has the groove 36 opposite the inner circumferential wall 11 of the upper shell 6. Even if the disk cartridge 1 is accidentally dropped and a large impact bends the cartridge case 2 and thus deforms the space accommodating the inner rotor 4, the structure described above can prevent the rim of the optical disk 3 from squeezing between the inner circumferential wall 11 and the main surface portion 4a of the inner rotor 4.

The disk cartridge 1 can therefore allow the inner rotor 4 to rotate even after such a large impact to ensure the recording/ playback of the optical disk 3. In addition, the disk cartridge 1 can prevent damage to the optical disk 3 because the inner rotor 4 does not force the optical disk 3 to rotate while the optical disk 3 is squeezed between the inner circumferential wall 11 of the upper shell 6 and the inner rotor 4. Furthermore, the disk cartridge 1 can prevent the optical disk 3 from squeezing between the inner circumferential wall 11 of the upper shell 6 and the inner rotor 4 and thus causing a gap between the lower shell halves 7a and 7b and the shutter members 5a and 5b around the first opening 23. This avoids the intrusion of foreign matter such as dust into the cartridge case 2.

The lower shell 7 of the disk cartridge 1, as described above, is separated in the lower shell halves 7a and 7b. The disk cartridge 1 therefore has lower strength and bends more easily than those including an unseparated lower shell, as disclosed in, for example, Japanese Unexamined Patent Application Publication No. 2001-332054. The disk cartridge 1 can still successfully protect the optical disk 3 because the inner circumferential wall 11 of the upper shell 6 enters the groove 36 on impact to prevent the optical disk 3 from squeezing between the inner circumferential wall 11 and the inner rotor 4.

Figure 23:
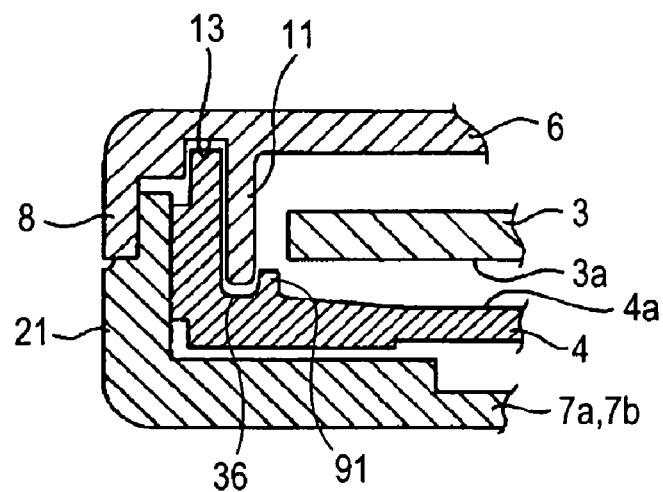
FIG. 23 is a partial sectional view illustrating a groove formed on an inner rotor according to a modification of the embodiment of the present invention.

In FIG. 12, as described above, the tapered portion 4b is disposed on the periphery of the main surface portion 4a of the inner rotor 4, and the groove 36 is formed on the tapered portion 4b along the base part of the annular portion 41. The groove 36 may also be defined by a wall portion 91 disposed on the tapered portion 4b, as shown in FIG. 23.

Figure 24:
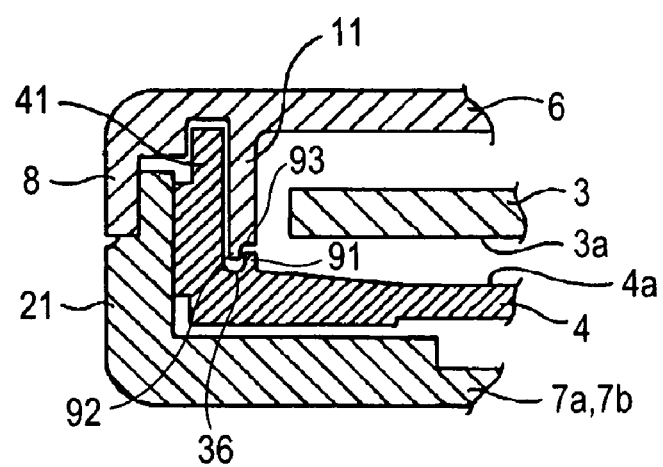
FIG. 24 is a partial sectional view illustrating a groove formed on an inner rotor according to another modification of the embodiment of the present invention.
Figure 25:
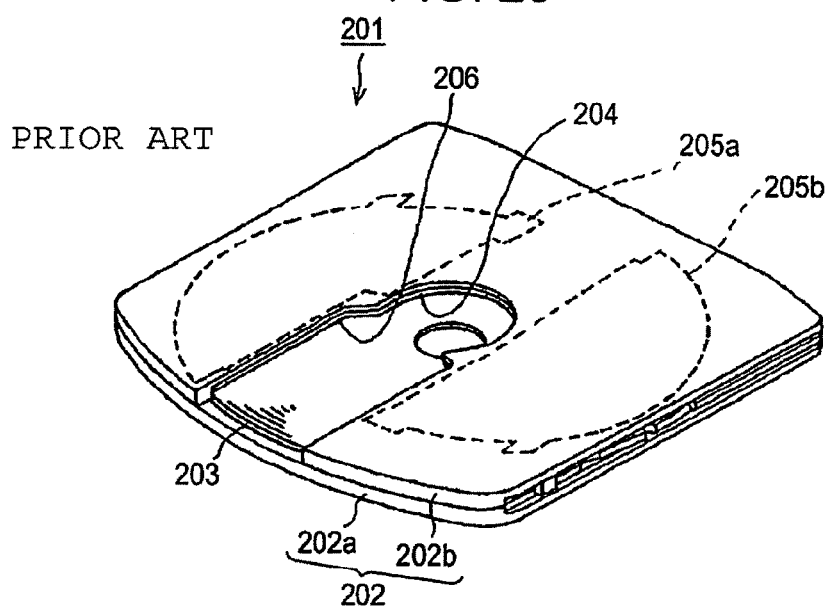
FIG. 25 is a bottom perspective view of a known disk cartridge.
Figure 26:
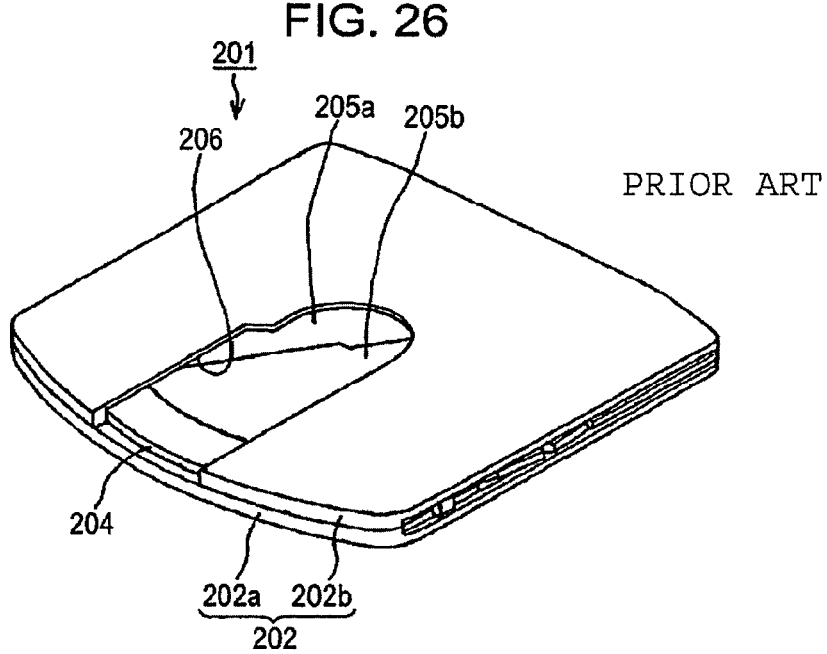
FIG. 26 is a perspective view illustrating a state where an opening of a lower shell of the known disk cartridge is closed.
Figure 27:
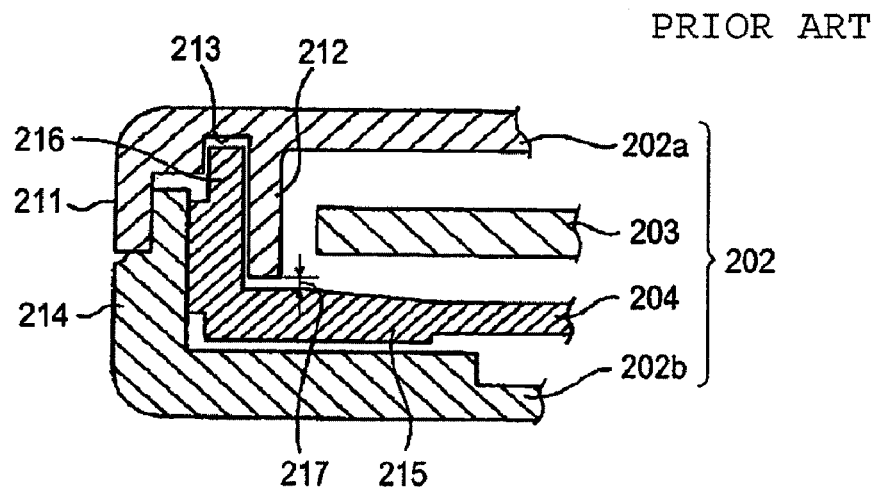
FIG. 27 is a partial sectional view illustrating the relative positions of an inner rotor and an inner circumferential wall of an upper shell in the known disk cartridge.
Figure 28:
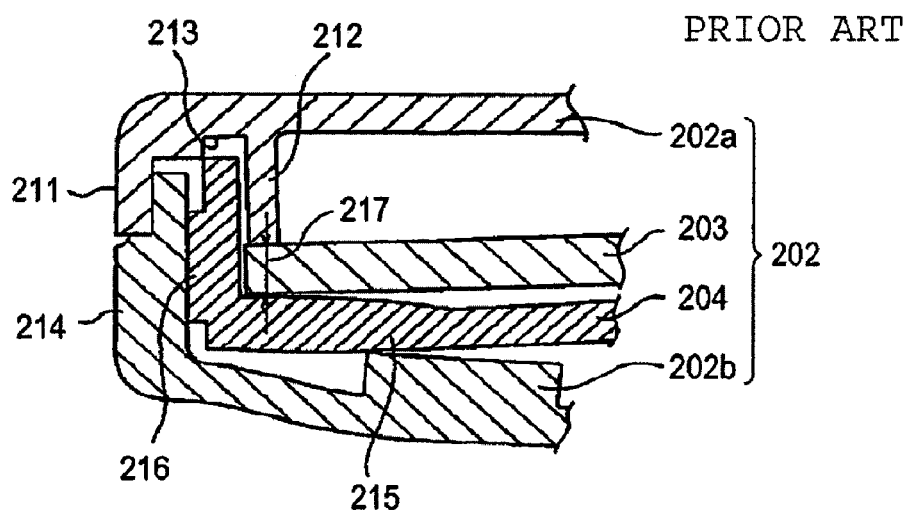
FIG. 28 is a partial sectional view illustrating a state where an optical disk is squeezed between the inner rotor and the inner circumferential wall of the upper shell.

In addition, a protrusion 92 may be formed at the leading end of the inner circumferential wall 11 of the upper shell 6, as shown in FIG. 24. The protrusion 92 engages with the groove 36 defined by the wall portion 91. A stepped portion 93 is left after the formation of the protrusion 92 at the leading end of the inner circumferential wall 11. The stepped portion 93 is normally separated from the wall portion 91 so as not to interfere with the rotation of the inner rotor 4. If the cartridge case 2 bends on impact and the space accommodating the inner rotor 4 deforms, the wall portion 91 butts against the stepped portion 93 to prevent the optical disk 3 from squeezing between the inner circumferential wall 11 and the inner rotor 4. The groove 36 may also be used as a guide groove for guiding the inner rotor 4 because the protrusion 92 of the inner circumferential wall 11 engages with the groove 36.

The present invention is not limited to the disk cartridge 1 described above, and may also be applied to, for example, a disk cartridge including an unseparated lower shell as disclosed in Japanese Unexamined Patent Application Publication No. 2001-332054 or one including an optical disk smaller than the optical disk 3 as a recording medium.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A disk cartridge comprising:

a cartridge case including an upper shell and a lower shell coupled thereto, the upper shell having an outer circumferential wall and an inner circumferential wall inside the outer circumferential wall, the lower shell having a first opening for at least one of recording and playback;

an inner rotor rotatably disposed in the cartridge case to rotatably accommodate a disk, the inner rotor having a second opening corresponding to the first opening and an annular portion on the periphery of the inner rotor, the inner circumferential wall of the upper shell being disposed inside the annular portion, the inner rotor having a groove opposite a leading end of the inner circumferential wall inside the annular portion, the groove having a width larger than the thickness of the leading end of the inner circumferential wall wherein the inner rotor has a wall portion inside the annular portion, the groove being defined between the wall portion and the annular portion; and shutter members disposed between the inner rotor and the lower shell and rotatably attached to the inner rotor, the shutter members being opened to expose the disk accommodated in the inner rotor through the first and second openings when the inner rotor rotates so that the second opening cooperates with the first opening.

2. The disk cartridge according to claim 1, wherein the leading end of the inner circumferential wall of the upper shell is positioned in the groove or at a same height as a periphery thereof.

3. The disk cartridge according to claim 1, wherein the inner rotor has a tapered portion inside the annular portion, the groove being disposed on the tapered portion.

4. The disk cartridge according to claim 1, wherein a protrusion is disposed at the leading end of the inner circumferential wall of the upper shell so as to engage the groove.

5. The disk cartridge according to claim 1, wherein the lower shell is separated in half.

* * * * *